Jan. 23, 1968 E. L. STOCKWELL 3,364,820
HYDRAULIC HOIST CONTROL SYSTEM
Filed Dec. 18, 1964 3 Sheets-Sheet 1
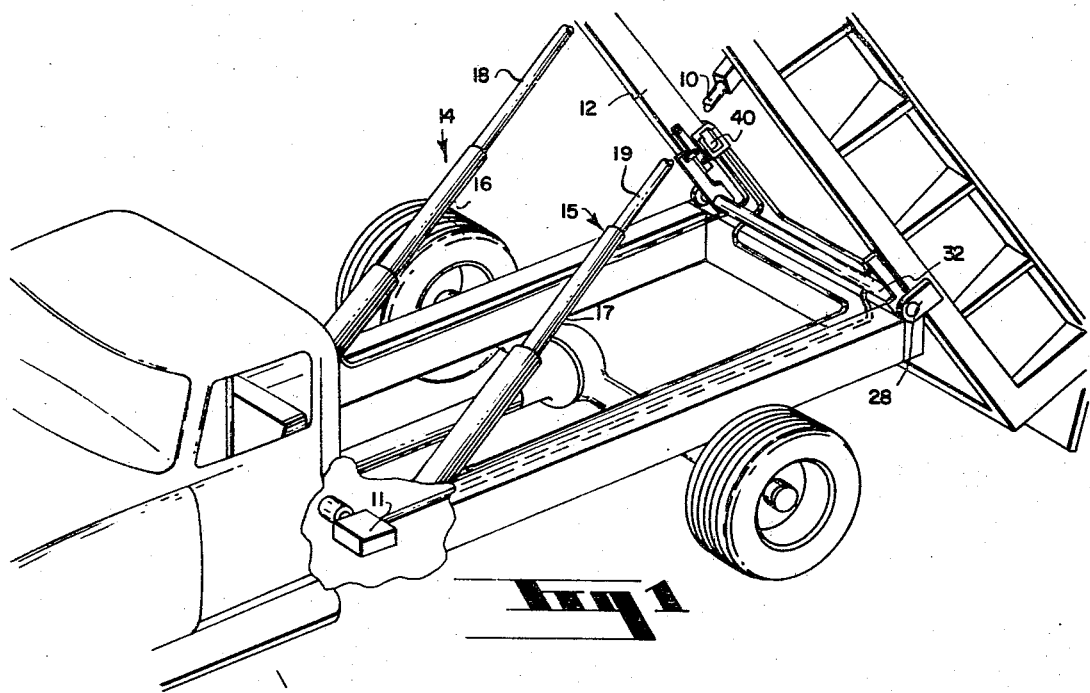
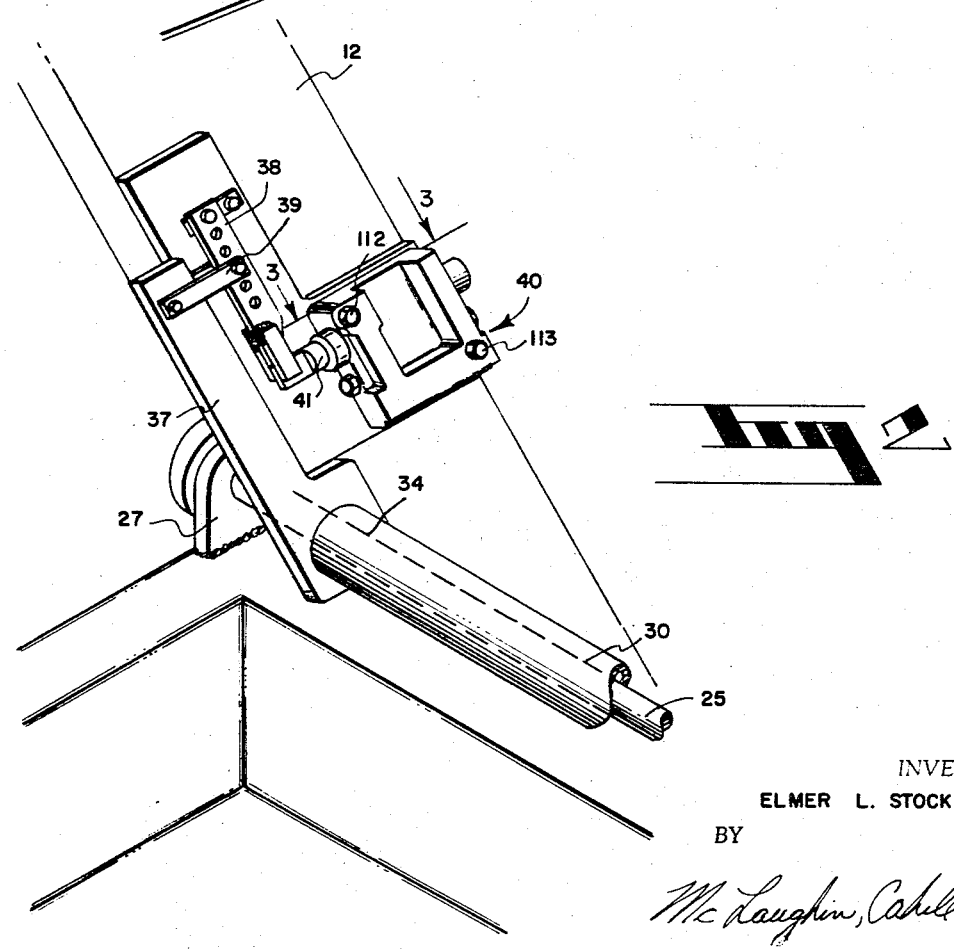
INVENTOR.
ELMER L. STOCKWELL
BY
McLaughlin, Cahill & Dummond Jan. 23, 1968

E. L. STOCKWELL 3,364,820

HYDRAULIC HOIST CONTROL SYSTEM

Filed Dec. 18, 1964

INVENTOR.
ELMER L. STOCKWELL
BY
McLaughlin, Cahill & Drummond

Jan. 23, 1968 E. L. STOCKWELL 3,364,820
HYDRAULIC HOIST CONTROL SYSTEM
Filed Dec. 18, 1964 3 Sheets-Sheet 3

INVENTOR.
ELMER L. STOCKWELL
BY

United States Patent Office 3,364,820
Patented Jan. 23, 1968

---

3,364,820
HYDRAULIC HOIST CONTROL SYSTEM
Elmer L. Stockwell, Greybull, Wyo. 82426
Filed Dec. 18, 1964, Ser. No. 419,327
12 Claims. (Cl. 91—171)

My invention relates to an improved dump truck combination and to distribution and control of hydraulic fluid in a system employing two or more hydraulic jacks or motors, such as employed in dump trucks.

The invention has primary utility in providing for the uniform operation of a plurality of hydraulic jacks employed to tilt a large dump body in either rear or side direction for the purpose of dumping a heavy load therefrom. The invention, however, may have other utility in related arts where the positive and close control of the operation of hydraulic motors of the ram type is involved.

While extensive development has occurred in the construction of large dump bodies, including mechanism intended to assure uniform lifting and lowering of the dump body, developments up to the present time have not been satisfactory, and problems in the operation of dump trucks continue to exist. The dumping of a load which is not uniformly distributed over both hydraulic jacks will place an uneven load on the hydraulic jacks and cause them to bind in such a way that the situation can be aggravated to the extent of causing the body to dump over sideways in extreme conditions.

When two hydraulic jacks are employed, an arrangement which is very common in the art, one jack sometimes fails in operation. If the operator for any reason does not observe such failure, the good jack continues to operate with the result that the truck and equipment may be seriously damaged. None of the previously suggested means for regulating jack movement on trucks, so far as I know, provides any means for overcoming this problem. Partial or complete failure of a jack to function in the intended manner can occur when the truck body is either being raised or lowered, and suitable control during the lowering operation has not been made available.

One approach to controlled operation of a plurality of hydraulic jacks to obtain uniform non-twisting dumping movement of the dump body is to attempt to control the hydraulic fluid and deliver the same amount of fluid to each jack. Patents 2,142,089 and 2,856,232 may be considered as partially illustrative of this approach. There are several obvious reasons why such systems fail, but it is enough to point out that they fail to correct conditions resulting from complete failure of a jack to operate, or a leakage in one jack which will require more fluid delivered to it to obtain the required lift.

Still another approach to securing uniformity of dumping movement is to reinforce the pivotal connections between the moving parts, adding of bracing and reinforcing mechanism and the like. In this connection, Patents Re. 20,812 and 2,731,293 are illustrative, and Patent 2,113,044 may be referred to as embodying both the feature of controlling fluid flow and providing additional bracing means, particularly in the location and construction of the jacks. While there is no doubt that by the use of massive bracing members destructive twisting of a dump body can be prevented, such massive bracing does not actually correct hydraulic jack malfunction. Moreover, it adds greatly to the weight of the dump truck and reduces the "pay load" by almost exactly the amount of the increased weight. Thus, the pay load of a truck using my improvements may be increased by as much as fifteen hundred pounds.

There are several reasons why patented developments of the type identified have been ineffective, the principal reasons being that either they do not work or that they add so much to the cost and weight of a dump unit and introduce such other manufacturing and operative characteristics as to be unacceptable. Some systems are somewhat successful during a dumping operation but provide no control whatsoever during the return or reverse movement of the body. Hydraulic control systems proposed have to a great extent been predicated on the delivery of the same amount of fluid to both hydraulic jacks, but I have found all such systems ineffective because they do not take into consideration relative pressures in various parts of the system which produce unequal flow, regardless of the fact that in theory the system is designed to deliver the same amount of fluid to both hydraulic jacks.

I am aware that many more or less precise control systems have been developed, patented and used in generally related environments, such, for example, as the control of machine elements, control of servo mechanism as in aircraft controls and the like, and that to the uninitiated it might appear to be obvious to utilize features of such systems in the hydraulic dump body field. There are several reasons why this is not the case, including the fact that frequently such devices and systems require such extreme accuracy of production, maintenance, etc., as to make them unfit for the rugged type of application involved in the truck field. Some systems obtain control, for example, by limiting the operating speed or holding such speed constant. Such a control system would be unsatisfactory for a dump truck, because dump truck hoists must operate at slow or fast speeds, and must be able to stop and start during a dumping cycle such as when grain is being delivered to an elevator or gravel is being spread on a road. In many systems, the movement involved is small and the device by its very nature cannot be modified to fit it for use on a dump body where commonly the hydraulic jacks comprise a plurality of telescoping cylinders and the total movement will be several feet.

Many devices developed and used in generally related fields employ a closed hydraulic fluid system with a fixed capacity cylinder and with fluid provided on both sides of the piston during a pressure stroke and is not controlled by the relative positions of two bodies, nor by the movement of the hydraulic fluid under pressure, nor by the employment of any principle which would be applicable to a hydraulic jack in which fluid must be delivered at only one end and usually discharged by the weight of the truck body during downward movement thereof.

Accordingly, it is an object of my invention to provide an improved hydraulic hoist control system particularly adaptable for use on dump trucks.

It is another object of the present invention to provide a dump truck hydraulic system intended for the elimination of the effects of uneven distribution of the load on the truck bed.

It is another object of the present invention to provide a hydraulic control system for controlling the delivery of hydraulic fluids to a pair of hydraulic jacks in such a manner as to accomplish equal travel of the jack piston rods.

It is still another object of the present invention to control the delivery of hydraulic fluid to hydraulic jacks in response to a small imbalance in the position of the jack piston rods in such a manner as to eliminate such imbalance.

It is a further object of the present invention to provide a control means between a pressure source and a pair of hydraulic cylinders functioning to cause uniform forward, and rearward, movement of pistons reciprocally supported in such cylinders.

It is still a further object of the present invention to provide an inexpensive and rugged hydraulic control unit which may be expeditiously installed on previously produced dumping units to provide control of hydraulic jack movement without replacement of the previously provided hoist equipment.

A further object of the present invention is to provide a hydraulic hoist control system that will prevent accidents in the event of a jack failure by properly controlling the flow of hydraulic fluid.

A further object of the present invention is to provide a hydraulic hoist control system that will reverse the control action of the system when the hoist is being lowered.

It is still another object of the present invention to provide a reversible hydraulic hoist control system including a safety provision that stops the hydraulic system in the event that control action does not reverse with a reverse of the hoist.

Other objects and advantages of the present invention will become apparent to those skilled in the art as the description thereof proceeds.

Briefly, in accordance with one embodiment of the present invention, a control means comprising a multiple control valve is mounted and secured to one portion of the truck bed receiving its principal upward movement from the forces exerted by one of two hydraulic jacks. A differential motion sensing control valve, integral with the multiple control valve, is positioned to sense differential movement of a second portion of the truck bed receiving its motion principally from the forces exerted by the second hydraulic jack. The multiple control valve also contains a reversing valve which reverses the sequence of fluid flow when the truck bed is being lowered. Differentials presented in the travel of the two previously mentioned portions of the truck bed are sensed by the control valve to appropriately reduce the hydraulic fluid to the leading hydraulic jack to thereby maintain the extension of the pistons of both hydraulic jacks substantially equal.

The present invention may more readily be described by reference to the accompanying drawings in which:

FIGURE 1 is a fragmentary perspective view of a dump truck indicating the utilization of a pair of hydraulic jacks for hoisting the truck bed.

FIGURE 2 is an enlarged isometric view of a portion of FIGURE 1 illustrating the manner in which the hydraulic hoist control system of the present invention is secured to the truck.

Figure 3:
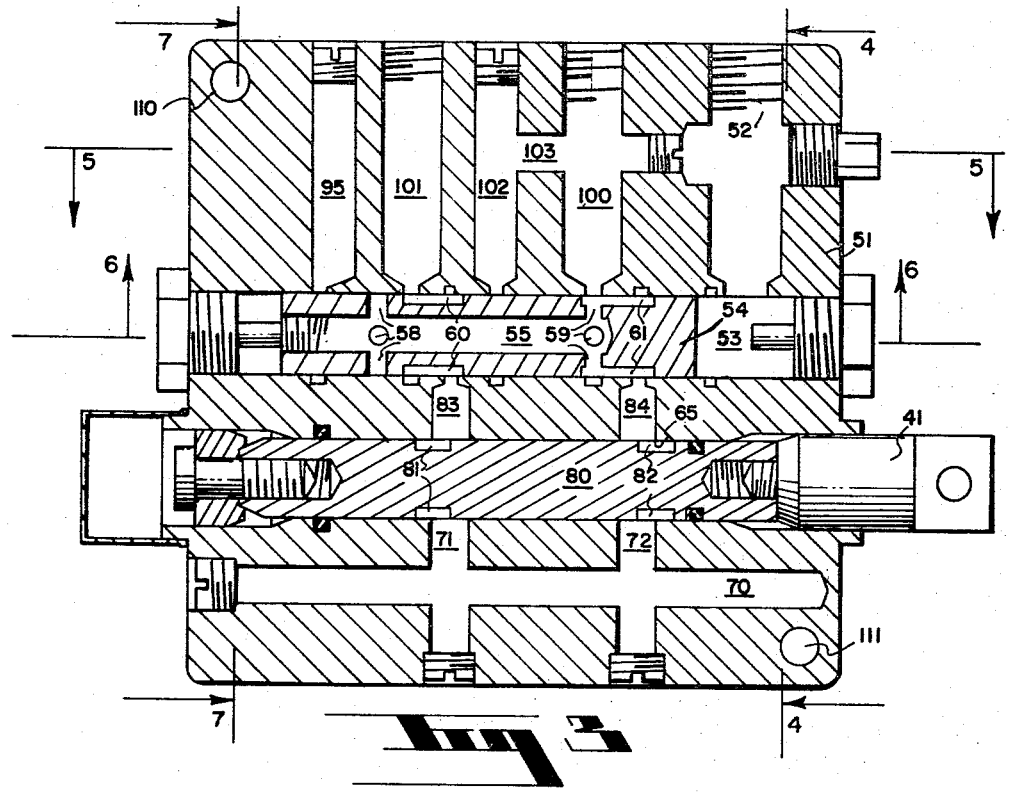
FIGURE 3 is a sectional view of the multiple control valve of the hydraulic hoist control system shown in FIGURE 2 taken along line 3—3.
Figure 4:
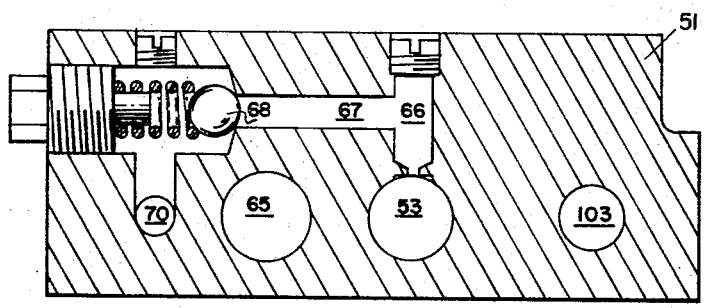
FIGURE 4 is a sectional view of FIGURE 3 taken along line 4—4.
Figure 5:
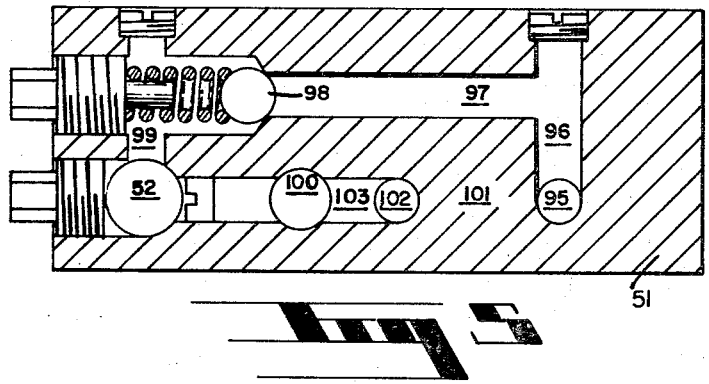
FIGURE 5 is a sectional view of FIGURE 3 taken along line 5—5.
Figure 6:
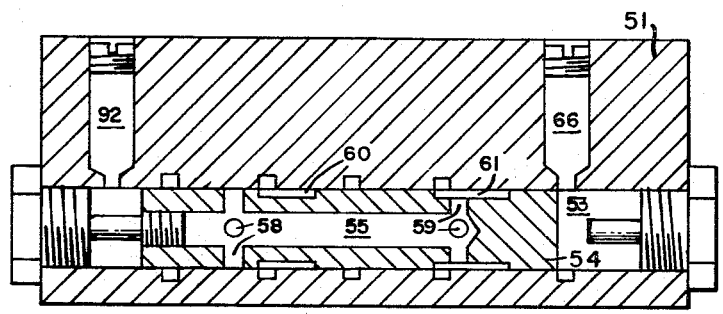
FIGURE 6 is a sectional view of FIGURE 3 taken along line 6—6.
Figure 7:
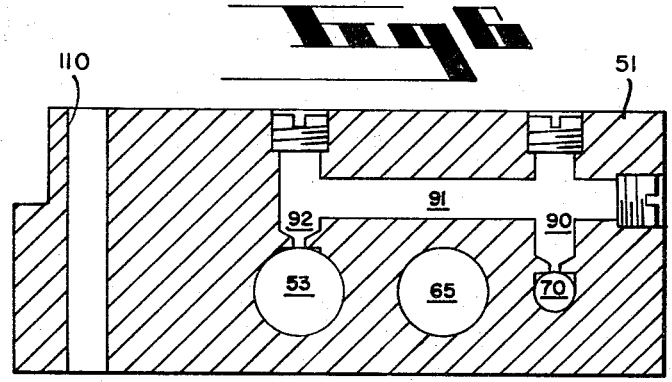
FIGURE 7 is a sectional view of FIGURE 3 taken along line 7—7.

Referring to FIGURE 1, the portion of the truck shown may be a conventional dump truck having a truck bed 10 pivoted about an axis positioned at the rear of the frame 12. A pair of hydraulic jacks 14 and 15 each having cylinders 16 and 17 respectively are appropriately mounted on the truck frame and are supplied with hydraulic fluid from a hydraulic pump, schematically shown in FIGURE 1 at 11, suitably driven through the power take-off mechanism (not shown) customarily provided on trucks. Pistons 18 and 19 extend from the cylinders 16 and 17 respectively and are secured to the bottom of the truck bed. In the event that the load carried by the truck bed is unevenly distributed, the many effects set forth previously are prevented by the system of the present invention by appropriately gating more or less hydraulic fluid to the appropriate hydraulic cylinders to maintain the corresponding hydraulic jack pistons substantially equally extended. Any tendency for the truck bed to tilt transverse to the pivotal axis thereof is immediately sensed by the control system of the present invention and corrected by the reduction of further hydraulic fluid to the correct hydraulic cylinder. The mounting of the sensing and control means of the present invention may more readily be seen by reference to FIGURE 2.

The truck bed may be arranged to pivot about any desired axis such as a longitudinal axis to provide what is commonly known as a "side delivery" dump truck. However, the embodiment chosen for illustration is a conventional type truck having a pivot axis transverse to normal direction of travel of the truck. The transverse axis for pivoting the truck bed is provided in the form of an axle 25 extending transversely of the truck frame. The axle may be supported in any convenient manner, such as by securing plates to the truck frame as shown in FIGURE 2. The truck bed includes mounting plates 27 and 28 extending therefrom and journalled on the transverse axle 25. A tubular member 30 extends over the axle and is free to concentrically rotate about the axis of the axle. One end 32 of the tubular member is secured to the adjacent portion of the truck bed frame 12; the opposite end 34 of the tubular member is utilized to detect differential motion between opposite sides of the truck bed. The tubular member 30 includes a mounting arm 37 extending therefrom to which is connected a differential control valve arm 41 through an adjustable motion-multiplying arrangement including pivoted arm 38 and connecting link 39. The differential control valve arm 41 forms a part of a multiple control valve 40 mounted on one side of the truck bed. Any motion of the arm 37 of the tubular member 30 relative to the side of the truck bed to which the multiple control valve is secured will be reflected as a motion of the differential control valve portion of the multiple control valve. In other words, any differential motion between opposite sides of the truck bed will be sensed by the multiple control valve.

Reference will now be made to FIGURES 3–7 wherein the multiple control valve is shown. The multiple control valve includes a major body portion 51 that may conveniently be a suitable casting. Hydraulic fluid is supplied to the multiple control valve at the opening or port 52 which communicates with a reversing valve or directional flow valve bore 53. The directional flow valve bore 53 slidably supports a directional flow valve piston 54 which is free to move axially within the bore 53. In the position shown in FIGURE 3, the piston is extended to the left-hand position. The piston 54 includes an internal axially-aligned channel 55 having radial openings 58 and 59 communicating from the surface of the piston. The piston 54 also includes annular channels 60 and 61, the latter of which communicates to the internal channel 55 through radial openings 59.

The directional flow valve bore 53 communicates to the bore 65 of a differential control valve through channels 66, 67, spring-loaded ball valve 68, channel 69, channel 70, and through channels 71 and 72. The spring-loaded ball valve 68 permits hydraulic fluid to flow from the bore 53 to the bore 65 but prevents hydraulic fluid from flowing in the reverse direction. The differential control valve bore 65 slidably supports a differential control valve piston 80 that includes annular channels 81 and 82 respectively. A pair of channels 83 and 84 are positioned diametrically of channels 71 and 72 respectively and communicate with the differential control valve bore 65 and the directional flow valve bore 53. The channels 71 and 83 as well as the channels 72 and 84 are positioned relative to the annular channels 81 and 82 so that movement by the differential control valve piston 80 will restrict the flow through one set of channels while decreasing the resistance to flow in the other set of channels.

Channel 70 also communicates with the left-hand (FIGURE 3) end of the bore 53 through channels 90, 91, and 92. A channel 95 communicates with the left-hand end of the bore 53 and also communicates with the inlet opening or port 52 through channels 96 and 97, spring-loaded ball valve 98, and channel 99. Thus, hydraulic fluid may flow from the channel 95 to the port 52 while the ball valve 98 prevents hydraulic fluid flow in the opposite direction. Outlet ports 100 and 101 are provided, while the former is also interconnected with a reversing port 102 interconnected by channel 103. A pair of holes 110 and 111 are provided to permit attachment of the multiple control valve to a suitable mounting plate, such as that shown in FIGURE 2, by machine screws 112 and 113.

The operation of the device of the present invention may now be described. It will be assumed that the load carried by the truck bed is unevenly distributed and that it is desired to discharge the load. The hydraulic pump 11, driven from the power take-off, supplies fluid to the port 52, to the bore 53 of the directional flow valve. The pressure of the hydraulic fluid forces the directional flow valve piston 54 to the left as indicated in FIGURE 3. Hydraulic fluid then flows through ports 66, 67, through the ball valve 68 to the channel 70. High pressure fluid is thus supplied from the hydraulic power source to the channel 70. From channel 70, the multiple control valve proportions the flow of the hydraulic fluid to the respective hydraulic jacks in accordance with the need of the respective jacks dictated by the motion of the truck bed. As the bed is lifted, hydraulic fluid flows from the channel 70 through channel 71 and around the annular channel 81 of the differential control valve piston 80. Hydraulic fluid from the annular channel 81 flows through channel 83, around the annular channel 60 of the directional flow valve piston 54 and through the channel 101 to the hydraulic jack 14. Simultaneously, hydraulic fluid flows from the channel 70 through channel 72, annular channel 82, channel 84, annular channel 61, through channel 100 to the jack 15. It may be seen that hydraulic fluid is thus fed to the respective hydraulic jacks proportionately to permit each jack to extend a corresponding distance. When the load is unevenly distributed, as was assumed in this example, one jack will begin to extend a greater distance than the other. Accordingly, one side of the bed moves relative to the other, and the relative motion will be detected as a displacement between the mounting arm 37 extending from the tubular member 30 and the truck bed frame 12 to which the multiple control valve 40 is attached. This relative motion may be amplified by the motion multiplying arrangement including the pivoted arm 38 and the connecting link 39. The differential motion is ultimately transmitted to the differential control valve arm 41 and results in a motion of the differential control valve piston 80. Assuming that the differential motion results in a movement of the piston 80 to the right in FIGURE 3, it may be seen that the annular channel 81 will become better aligned with channels 71 and 83 to thereby reduce resistance to hydraulic fluid flow; whereas, the annular channel 82 will become more misaligned relative to channels 72 and 84 thereby increasing the resistance to hydraulic fluid flow. In the extreme condition, the annular channel 82 may be shifted completely to the right so that the channels 72 and 84 are no longer in communication and no fluid will pass from one to the other. When the differential control valve piston has been moved to the right as indicated above, hydraulic fluid will readily flow to the hydraulic jack connected to the channel 101 to cause it to extend further while the hydraulic fluid provided to channel 100 will be greatly restricted, thus causing the hydraulic jack connected thereto to extend at a much reduced rate. In the extreme condition, when one jack becomes disabled, the differential control valve piston 80 will be moved to its extreme right or extreme left position to thereby completely shut off hydraulic fluid to the operating jack to thereby prevent the continued extension of the operating jack to ultimately cause a tipping of the load and possible severe damage to equipment and personnel. Accordingly, the rate at which hydraulic fluid is admitted to the respective cylinders of the hydraulic jacks will be altered in accordance with the demands of the load borne by the truck bed and will effect a counter balancing of the weight carried by the hydraulic pistons even though the weight distribution is unequal. In the extreme case, the differential control valve piston 80 may extend to the extreme right or extreme left to effect a complete cut-off of hydraulic fluid to one of the pistons to thereby direct all of the hydraulic fluid to the other of the hydraulic pistons; under such extreme circumstances, the action of the present system provides an important safety feature by preventing continued extension of the unaffected jack when one jack binds or becomes disabled.

When the truck bed is to be lowered, the motion imparted to the respective hydraulic jacks must be reversed; accordingly, any differential control system that provides hydraulic fluid to maintain jack extension approximately equal will be inoperative when the jacks are to be lowered. Accordingly, the action of the differential control valve of the present invention is reversed by the reversal of the directional control valve. When the hydraulic pump has been turned off, the hydraulic fluid in the hydraulic jacks is at a higher pressure than the hydraulic fluid at the pump. Accordingly, the pressures at channels 100 and 101 are higher than the pressure of the fluid at the port 52 thereby causing the hydraulic fluid to reverse its flow through the multiple control valve. It will be remembered, that hydraulic fluid flow between directional flow valve bore 53 and channel 70 was effected through a spring-loaded ball valve 68. Accordingly, hydraulic fluid cannot flow from channel 70 to bore 53. Instead, hydraulic pressure acting from channels 100 and 101 through the directional flow valve piston 54, and through the annular channels 81 and 82 of the differential control valve piston 80 forces hydraulic fluid to flow from channels 100 and 101 to the channel 70 through channels 90, 91, and 92 to the left-hand end of the directional flow valve bore 53. Pressure is thus exerted at the left end of the directional flow valve piston 54 forcing the latter to the extreme right position. When the piston 54 is in its right-hand position, the channel 70 communicates to channel 95 through the bore 53 and from the channel 95 through channels 96, 97, ball valve 98, channel 99 to the port 52. Thus, a path has been provided for reverse hydraulic fluid flow from the outlet channels 100 and 101 to the inlet port 52 through a different path than the same hydraulic fluid must take when the hydraulic jacks are being extended. The ball valve 98 permits hydraulic fluid to flow from the channel 95 to the port 52 but inhibits reverse fluid flow. Thus, immediately upon reversal of hydraulic pressures, no hydraulic fluid is permitted to return to the hydraulic pump without first insuring that the directional flow valve piston 54 has been repositioned to its extreme right-hand position—the reverse flow position.

When the directional flow valve piston 54 has been moved to the extreme right, channel 101 now communicates with channel 84 through radial openings 58, interior channel 55, and radial openings 59. Similarly, channel 100 now communicates with channel 83 through the channel 103, reversing channel 102 and annular channel 60 which is now registered with the opening of channel 102 into the bore 53. Any regulation of hydraulic fluid flow between the channels 100 and 101 is now reversed. For example, whereas a motion of the differential control valve piston 80 to the right previously restricted flow from the channel 72 to the channel 84 through the directional flow valve to the channel 100, the same differential control valve motion will now restrict flow from channel 72 to channel 84 and ultimately to outlet channel 101 rather than the channel 100. Therefore, as the truck bed is being lowered, and one side of the bed drops faster than the other, a greater restriction to hydraulic fluid flow will be presented to the jack that is dropping faster to thereby restrict the rate at which that jack retracts and restrict the rate at which that side of the truck bed drops. Accordingly, both jacks are lowered evenly and both sides of the truck bed are lowered uniformly. As in the case when the truck bed is being raised, if one of the jacks should bind, the differential control valve piston 80 will be moved to the extreme right or to the extreme left to prevent the operating jack from continuing its descent with the possible result that the truck and bed may be severely damaged. It may therefore be seen that when the reversing valve piston 54 is forced to the right-hand position, the relationship of the regulation of the hydraulic fluid flow provided by the differential control valve is the exact reverse of the same relationship existing when the reversing valve is in its left-hand position. With the reversing valve in the right-hand position, the differential control action provided by the differential control valve will have an opposite effect upon the hydraulic cylinders thereby resulting in greater resistance to fluid flow from the hydraulic cylinder having its piston in a position lower than the piston of the opposite hydraulic cylinder. If the load is distributed evenly over the truck bed, then no correcting regulation of the hydraulic fluid becomes necessary, and the system of the present invention will not effect the fluid flow to or from the hydraulic cylinders. Further, the additional safety factor has been provided by the multiple control valve of the present invention by providing a separate and distinct path for the hydraulic fluid when it flows in a reverse direction through the multiple control valve. It is the separate and distinct path that insures that the directional flow valve is in its reversed position before the differential control valve may operate upon the hydraulic fluid flow to effect regulation. In this manner, the correct differential control is effected without the possibility that the reversing valve or directional flow valve has become stuck or frozen and does not reverse the differential controlling action.

The differential motion of two portions of the truck bed may be sensed by the multiple control valve of the present invention through a variety of mounting arrangements. It has been found that the use of a tubular member as shown in FIGURE 2, with the concomitant extension arm, provides a rugged, reliable, and inexpensive method for mounting the multiple control valve. Several other mounting arrangements have been found to be suitable, such as, for example, mounting the multiple control valve directly on one of the hydraulic jacks, and extending an arm from the other hydraulic jack to the multiple control valve to be connected therewith at the differential control valve piston. In this manner, differential motions of the two hydraulic jacks may be readily sensed in a very direct and incomplicated manner; various other methods for deriving a differential motion, or a motion proportional to the differential motion, of the two hydraulic jacks may be used.

The present invention, therefore, provides a hydraulic hoist control system that is relatively inexpensive and exceedingly rugged. The system, when installed, provides continuous unaided action to insure proper hydraulic control regardless of the position of the truck bed or the distribution of the load thereon. Reversing the motion of the hydraulic fluid supplied to the hydraulic cylinders will not affect the action imparted by the differential extension of the hydraulic pistons. It will be apparent to those skilled in the art that many modifications may be made without departing from the spirit and scope of the invention as defined in the claims pending hereto.

I claim:
1. In a hydraulic hoist control system, a multiple control valve comprising:
   (a) an inlet port for connecting said multiple control valve to a source of hydraulic fluid,
   (b) a first and a second outlet port for connecting said multiple control valve to hydraulic jacks,
   (c) means defining first, second, third and fourth channels,
   (d) a directional flow valve having a first and a second position for directing fluid, when in said first position, from said first and second channels to said third and fourth channels respectively, and for directing fluid, when in said second position, from said third and fourth channels to said second and first channels respectively,
   (e) means connecting said third and fourth channels to said first and second outlet ports respectively,
   (f) means connected to said inlet port responsive to fluid flowing from the source of hydraulic fluid into said inlet port, for forcing said directional flow valve into said first position, and fluid flowing from the hydraulic jacks and out of said inlet port for forcing said directional flow valve into said second position.

2. In a hydraulic hoist control system, a multiple control valve comprising:
   (a) an inlet port for connecting said multiple control valve to a source of hydraulic fluid,
   (b) a first and a second outlet port for connecting said multiple control valve to hydraulic jacks,
   (c) differential control means connected to said inlet port for dividing hydraulic fluid from said inlet port into first and second channels in accordance with the position of said differential control means,
   (d) a directional flow valve connecting, when in a first position, said first and second channels to said first and second outlet ports respectively, and connecting, when in a second position, said first and second channels to said second and first outlet ports respectively, said directional flow valve being responsive to fluid flowing from the source of hydraulic fluid into said inlet port to the hydraulic jacks for assuming said first position, and said directional flow valve being responsive to fluid flowing from the hydraulic jacks through the inlet port to the source of hydraulic fluid for assuming said second position.

3. In a hydraulic hoist control system, a multiple control valve comprising:
   (a) an inlet port for connecting said multiple control valve to a source of hydraulic fluid,
   (b) a first and a second outlet port for connecting said multiple control valve to hydraulic jacks,
   (c) differential control means connected to said inlet port for dividing hydraulic fluid from said inlet port into first and second channels in accordance with the position of said differential control means,
   (d) a directional flow valve connecting, when in a first position, said first and second channels to said first and second outlet ports respectively, and connecting, when in a second position, said first and second channels to said second and first outlet ports respectively, and
   (e) means responsive to fluid flowing from the source of hydraulic fluid into said inlet port to the hydraulic jacks for forcing said directional flow valve into said first position, and responsive to fluid flowing from the hydraulic jacks and out of said inlet port to the source of hydraulic fluid for forcing said directional flow valve to said second position.

4. A hoist control system, for use on a dump truck having a bed rotatable about an axis, comprising:
   (a) a pressurized source of hydraulic fluid,
   (b) a first and a second hydraulic hoist,
   (c) a differential control valve connecting said pressurized source to said hydraulic hoists for restricting the flow of hydraulic fluid to the hydraulic hoist with the greater travel while said hydraulic hoists are being extended, and
   (d) directional flow valve means for restricting flow of hydraulic fluid from the hydraulic hoist with the lesser travel by interchanging the connection of said hydraulic hoists to said differential control valve thereby maintaining approximately equal travel of said hydraulic hoists while they are being retracted,
   (e) means responsive to fluid flow from the source of hydraulic fluid to said hydraulic hoist for forcing said directional flow valve means into a first position and responsive to fluid flow from the hydraulic hoist to the source of hydraulic fluid for forcing said directional flow valve means into a second position.

5. A hoist control system, for use on a dump truck having a bed rotatable about an axis, comprising:
(a) a pressurized source of hydraulic fluid,
(b) a first and a second hydraulic hoist,
(c) a differential control valve connecting said pressurized source to said hydraulic hoists for restricting the flow of hydraulic fluid to the hydraulic hoist with the greater travel while said hydraulic hoists are being extended, and
(d) directional flow means responsive to the direction of fluid flow between said hydraulic hoists and said pressurized source for restricting flow of hydraulic fluid from the hydraulic hoist with the lesser travel while said hydraulic hoists are being retracted,
(e) means responsive to fluid flow from the source of hydraulic fluid to said hydraulic hoist for forcing said directional flow means into a first position and responsive to fluid flowing from the hydraulic hoist to the source of hydraulic fluid for forcing said directional flow means to a second position.

6. A hoist control system, for use on a dump truck having a bed rotatable about an axis, comprising:
(a) a pressurized source of hydraulic fluid,
(b) a first and a second hydraulic hoist,
(c) a differential control valve connecting said pressurized source to said hydraulic hoists for restricting the flow of hydraulic fluid to the hydraulic hoist with the greater travel while said hydraulic hoists are being extended,
(d) directional flow valve means for restricting flow of hydraulic fluid from the hydraulic hoist with the lesser travel by interchanging the connection of said hydraulic hoists to said differential control valve thereby maintaining approximately equal travel of said hydraulic hoists while they are being retracted, and
(e) means responsive to fluid flowing from the source of hydraulic fluid to the hydraulic hoist for forcing said directional flow valve means into a first position, and responsive to the fluid flowing from the hydraulic hoist to the source of hydraulic fluid for forcing said directional flow valve means to a second position.

7. A hoist control system, for use on a dump truck having a bed rotatable about an axis, comprising:
(a) a pressurized source of hydraulic fluid,
(b) a first and a second hydraulic hoist,
(c) sensing means for sensing unequal hydraulic hoist travel,
(d) a control valve arm connected to said sensing means,
(e) control valve means connecting said pressurized source to said hydraulic hoists and connected to said control valve arm for restricting the flow of hydraulic fluid to the hydraulic hoist with the greater travel in accordance with the position of said control valve arm,
(f) directional flow valve means for restricting flow of hydraulic fluid from the hydraulic hoist with a lesser travel by interchanging the connection of said hydraulic hoist to said differential flow valve means thereby maintaining approximately equal travel of said hydraulic hoist while they are being retracted, and
(g) means responsive to fluid flowing from the source of hydraulic fluid to the hydraulic hoist for forcing said directional flow valve means into a first position, and responsive to fluid flowing from the hydraulic hoist to the source of hydraulic fluid for forcing said directional flow valve means to a second position.

8. A hoist control system, for use on a dump truck having a bed rotatable about an axis, comprising:
(a) a pressurized source of hydraulic fluid,
(b) a first and a second hydraulic hoist,
(c) sensing means for sensing unequal hydraulic hoist travel,
(d) a control valve arm connected to said sensing means,
(e) control valve means connecting said pressurized source to said hydraulic hoists and connected to said control valve arm for restricting the flow of hydraulic fluid to the hydraulic hoist with the greater travel in accordance with the position of said control valve arm while said hydraulic hoists are being extended,
(f) directional flow valve means for restricting flow of hydraulic fluid from the hydraulic hoist with the lesser travel while said hydraulic hoists are being retracted, and
(g) means responsive to fluid flowing from the source of hydraulic fluid to the hydraulic hoist for forcing said directional flow valve means into a first position, and responsive to fluid flowing from the hydraulic hoist to the source of hydraulic fluid for forcing said directional flow valve means to a second position.

9. A hoist control system, for use on a dump truck having a bed rotatable about an axis, comprising:
(a) a pressurized source of hydraulic fluid,
(b) a first and a second hydraulic hoist,
(c) sensing means for sensing unequal hydraulic hoist travel,
(d) a control valve arm connected to said sensing means,
(e) control valve means connecting said pressurized source to said hydraulic hoists and connected to said control valve arm for restricting the flow of hydraulic fluid to the hydraulic hoist with the greater travel in accordance with the position of said control valve arm while said hydraulic hoists are being extended, and
(f) directional flow valve means responsive to a reversal of hydraulic fluid flow for reversing the control action of said control valve means to thereby restrict flow of hydraulic fluid from the hydraulic hoist with the lesser travel while said hydraulic hoists are being retracted.

10. A hoist control system, for use on a dump truck having a bed rotatable about an axis, comprising:
(a) a pressurized source of hydraulic fluid,
(b) a first and a second hydraulic hoist,
(c) sensing means for sensing unequal hydraulic hoist travel,
(d) a control valve arm connected to said sensing means,
(e) control valve means connecting said pressurized source to said hydraulic hoists and connected to said control valve arm for restricting the flow of hydraulic fluid to the hydraulic hoist with the greater travel in accordance with the position of said control valve arm while said hydraulic hoists are being extended, and
(f) directional flow valve means for restricting flow of hydraulic fluid from the hydraulic hoist with the lesser travel while said hydraulic hoists are being retracted by interchanging the connections of said hydraulic hoists to said control valve means,
(g) means responsive to fluid flowing from the source of hydraulic fluid to the hydraulic hoist for forcing said directional flow valve means into a first position, and responsive to fluid flowing from the hydraulic hoist to the source of hydraulic fluid for forcing said directional flow valve means to a second position.

11. A hoist control system, for use on a dump truck having a bed rotatable about an axis, comprising:
(a) a pressurized source of hydraulic fluid,
(b) a first and a second hydraulic hoist,
(c) sensing means for sensing unequal hydraulic hoist travel,
(d) a control valve arm connected to said sensing means,
(e) control valve means connecting said pressurized source to said hydraulic hoists and connected to said control valve arm for restricting the flow of hydraulic fluid to the hydraulic hoist with the greater travel in accordance with the position of said control valve arm while said hydraulic hoists are being extended, and
(f) directional flow valve means responsive to the direction of fluid flow between said hydraulic hoists and said pressurized source for restricting flow of hydraulic fluid from the hydraulic hoist with the lesser travel while said hydraulic hoists are being retracted,
(g) means responsive to fluid flowing from the source of hydraulic fluid to the hydraulic hoist for forcing said directional flow valve means into a first position, and responsive to fluid flowing from the hydraulic hoist to the source of hydraulic fluid for forcing said directional flow valve means to a second position.

12. In a hydraulic hoist control system, a multiple control valve comprising:
(a) an inlet port for connecting said multiple control valve to a source of hydraulic fluid,
(b) a first and a second outlet port for connecting said multiple control valve to utilization devices,
(c) differential control means connected to said inlet port for dividing hydraulic fluid from said inlet port into first and second channels in accordance with the position of said differential control means,
(d) a directional flow valve connecting, when in a first position, said first and second channels to said first and second outlet ports respectively, and connecting, when in a second position, said first and second channels to said second and first outlet ports respectively, and
(e) means including interconnecting channels and ball valves responsive to the direction of fluid flow for forcing said directional flow valve from said first position to said second position when hydraulic fluid flows from said outlet ports to said inlet port.

References Cited

UNITED STATES PATENTS

| | | | |
|---|---|---|---|
| 2,343,912 | 3/1944 | Lauk | 91—447 |
| 2,365,095 | 12/1944 | Miller et al. | 91—171 |
| 2,479,089 | 8/1949 | Voskamp | 91—171 |

FOREIGN PATENTS

| | | |
|---|---|---|
| 40,245 | 12/1909 | Austria. |
| 196,903 | 4/1958 | Austria. |
| 382,791 | 11/1932 | Great Britain. |

MARTIN P. SCHWADRON, *Primary Examiner.*

PAUL E. MASLOUSKY, EDGAR W. GEOGHEGAN, *Examiners.*